(12) United States Patent
Meihofer et al.

(10) Patent No.: US 6,278,723 B1
(45) Date of Patent: Aug. 21, 2001

(54) METHOD AND APPARATUS FOR MINIMIZING A PROBABILITY OF SELF-INTERFERENCE AMONG NEIGHBORING WIRELESS NETWORKS

(75) Inventors: Eric F. Meihofer, Euless; Leo G. Dehner, Southlake, both of TX (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/521,153

(22) Filed: Mar. 8, 2000

(51) Int. Cl.⁷ ....................................... H04B 15/00
(52) U.S. Cl. ................... 375/133; 375/132; 375/131; 375/138
(58) Field of Search ..................... 375/133, 132, 375/131, 138, 220; 370/330, 338, 468; 455/63, 67.3

(56) References Cited

U.S. PATENT DOCUMENTS

| | | | |
|---|---|---|---|
| 5,398,258 | * 3/1995 | Su et al. | 375/200 |
| 5,528,597 | 6/1996 | Gerszberg et al. | 370/95.3 |
| 6,041,046 | * 3/2000 | Scott et al. | 370/319 |
| 6,049,561 | * 4/2000 | Pezzlo et al. | 375/132 |
| 6,115,411 | * 9/2000 | Van Driest | 375/200 |

* cited by examiner

*Primary Examiner*—Stephen Chin
*Assistant Examiner*—Mohammad Ghayour
(74) *Attorney, Agent, or Firm*—R. Louis Breeden; Charles W. Bethards

(57) ABSTRACT

A first master transceiver (102) of a first wireless network monitors (602) neighboring wireless networks to discover a strongest interfering master transceiver in one of the neighboring wireless networks. The first master transceiver then time-aligns (604) hop intervals of the first master transceiver with the hop intervals of the strongest interfering master transceiver to ensure that a transmission of the strongest interfering master transceiver during each hop interval used by the strongest interfering master transceiver cannot interfere with the transmission of the first master transceiver during more than one hop interval of the first master transceiver, thereby minimizing the probability of self-interference between the first wireless network and the one of the neighboring wireless networks.

21 Claims, 3 Drawing Sheets

METHOD AND APPARATUS FOR MINIMIZING A PROBABILITY OF SELF-INTERFERENCE AMONG NEIGHBORING WIRELESS NETWORKS

FIELD OF THE INVENTION

This invention relates in general to wireless communication systems, and more specifically to a method and apparatus for minimizing a probability of self-interference among neighboring wireless networks operating in accordance with differing frequency hopping plans that are not frequency-coordinated among the neighboring wireless networks.

BACKGROUND OF THE INVENTION

The demand for wireless local area networks is expected to undergo an explosive growth as short-range ad-hoc wireless network devices, such as Bluetooth devices, become readily available in the market place. Personal area networks (PANs) will be deployed in areas like airports, hotels, and convention centers. These PANs (also known as pico networks) advantageously can provide high-bandwidth local connectivity for the mobile user at a low cost. PAN applications range from simple email transfers to high content web page downloads and real-time video.

Currently, PAN devices in the U.S. operate over the unlicensed 2.4 GHz ISM (Industrial Scientific and Medical) spectrum under the FCC part 15 rules. These rules require neighboring wireless networks to operate in accordance with frequency hopping plans that are not frequency-coordinated among the neighboring wireless networks. The unrestricted access to the ISM spectrum exposes the devices to interference problems that can be classified into two categories. The first category regards the interference caused by non-PAN devices. Interferers within this category include cordless phones, microwave ovens, and other types of wireless local area networks. The second interference category includes other similar PAN devices which operate in the vicinity of a PAN. Interferers in this category may be part of the PAN or of any other neighboring PAN. This type of interference is referred to as self-interference, and it can reduce the throughput of the PAN.

Thus, what is needed is a method and apparatus for minimizing a probability of self-interference among neighboring wireless networks operating in accordance with differing frequency hopping plans that are not frequency-coordinated among the neighboring wireless networks.

DETAILED DESCRIPTION OF THE DRAWINGS

Figure 1:
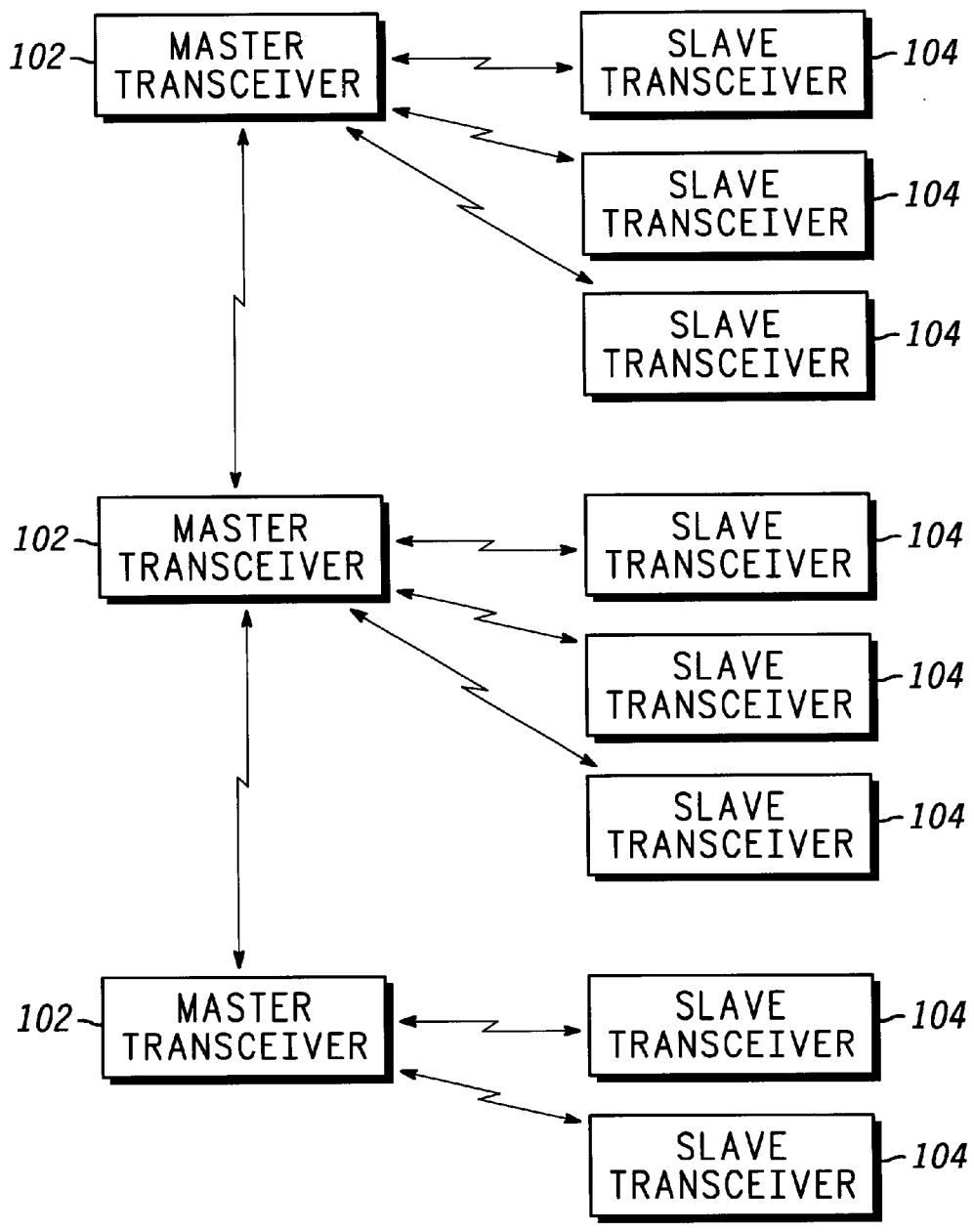
FIG. 1 is an electrical block diagram depicting three exemplary neighboring wireless networks in accordance with the present invention.

Referring to FIG. 1, an electrical block diagram 100 depicting three exemplary neighboring wireless networks in accordance with the present invention comprises three master transceivers 102, each communicating wirelessly with one or more slave transceivers 104, thereby forming the three neighboring wireless networks. The wireless networks preferably utilize a well-known wireless networking protocol, such as described in the Bluetooth Specification v1.0B, available on the Internet from the Bluetooth Special Interest Group. The wireless transmissions between the transceivers 102, 104 preferably utilize a frequency hopping technique in which many different radio transmission frequencies are utilized. A current transmission frequency lasts for a duration referred to herein as a "hop interval" and then is generally replaced by a different transmission frequency for a next hop interval, and so on. The master transceivers 102 preferably control the timing of their respective networks, the slave transceivers 104 being synchronized to the master transceiver 102 of each network. As indicated, the master transceivers 102 can also synchronize to and communicate with other master transceivers 102 in neighboring wireless networks. Operation of the wireless networks in accordance with the present invention will be described further herein below.

Figure 2:
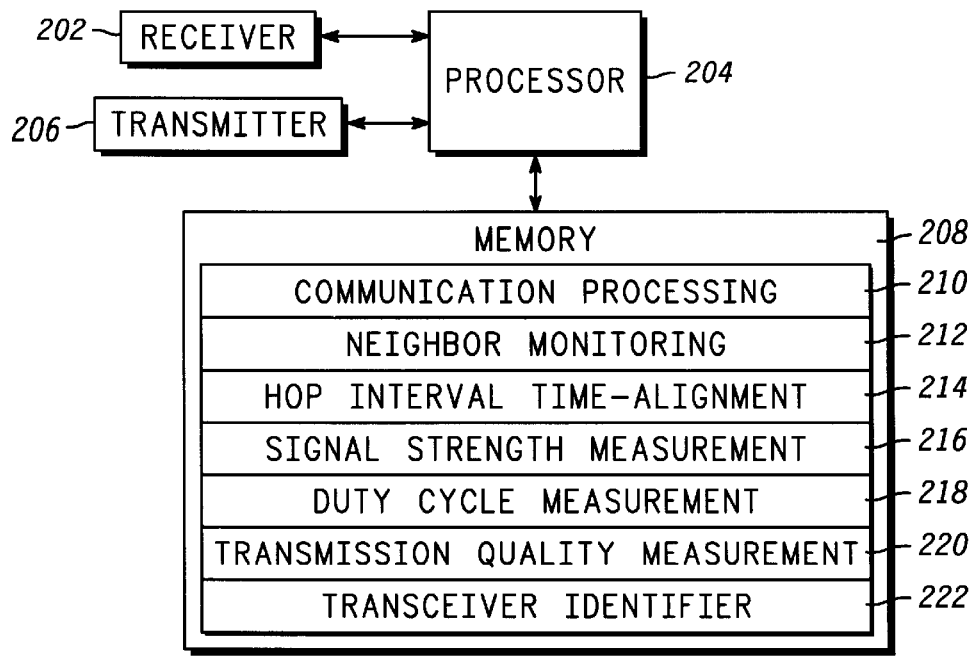
FIG. 2 is an electrical block diagram of an exemplary transceiver in accordance with the present invention.

Referring to FIG. 2, an electrical block diagram depicts an exemplary transceiver 102, 104 in accordance with the present invention, which can be either a master transceiver 102 or a slave transceiver 104, as the two have identical electrical block diagrams, and can switch roles during operation. The master transceiver 102 is described in the following, as most aspects of the present invention are performed by the master transceiver 102. The master transceiver 102 comprises a conventional receiver 202 for receiving communications from the slave transceivers 104 in its own wireless network, and further for monitoring the neighboring wireless networks to discover a strongest interfering master transceiver 102 in one of the neighboring wireless networks. The master transceiver 102 further comprises a processor 204 coupled to the receiver 202 and coupled to a transmitter 206 for controlling the receiver 202 and the transmitter 206 in accordance with the present invention. The transmitter 206 is for sending information to the slave transceivers 104 operating in the wireless network of the master transceiver 102, as well as for controlling the slave transceivers 104.

The processor 204 is coupled to a memory 208 for storing operating software and variables used in accordance with the present invention. The memory 208 comprises a communication processing program 210 for programming the processor 204 to control the receiver 202 and the transmitter 206 to communicate according to the wireless networking protocol utilized in the wireless networks, and further in accordance with the present invention. The memory 208 further comprises a neighbor monitoring program 212 for programming the processor to cooperate with the receiver 202 to monitor the neighboring wireless networks to discover a strongest interfering master transceiver 102 in one of the neighboring wireless networks. The memory 208 also includes a hop interval time-alignment program 214 for programming the processor 204 to time-align frequency hop intervals of the master transceiver 102 with the frequency hop intervals of the strongest interfering master transceiver 102 to ensure that a transmission of the strongest interfering master transceiver 102 during each hop interval used by the strongest interfering master transceiver 102 cannot interfere with the transmission of the master transceiver 102 during more than one hop interval of the master transceiver 102. The hop interval time-alignment program 214 preferably programs the processor 204 to time-align transmit hop intervals of the master transceiver 102 with the transmit hop intervals of the strongest interfering master transceiver 102, through well-known synchronization techniques, and, preferably, to time-align receive hop intervals of the master transceiver 102 with the receive hop intervals of the strongest interfering master transceiver 102. This will provide the best resistance to interference, because a neighboring master transceiver 102 will then seldom be receiving while another is transmitting.

In addition, the memory 208 includes a signal strength measurement program 216 for programming the processor 204 to cooperate with the receiver 202 to measure signal strengths of neighboring interfering master transceivers 102, through well-known techniques, and to select an interfering master transceiver 102 having a highest signal strength as the strongest interfering master transceiver 102. The memory 208 further comprises a duty cycle measurement program 218 for programming the processor 204 to cooperate with the receiver 202 to measure duty cycles of neighboring interfering master transceivers 102; and to select an interfering master transceiver 102 as the strongest interfering master transceiver 102 according to the duty cycle of the interfering master transceiver 102. It will be appreciated that the signal strength measurement program 216 and the duty cycle measurement program 218 can be used together, giving partial weight to each. For example, the processor 204 could be programmed to find the products of the signal strengths and the duty cycles of the neighboring interfering master transceivers 102 and to select an interfering master transceiver 102 as the strongest interfering master transceiver 102 according to the products of the signal strengths and the duty cycles.

The memory 208 further comprises a transmission quality measurement 220 for programming the processor 204 to maintain statistics on an outbound (from the master transceiver) transmission quality, e.g., from acknowledgment responses, and an inbound transmission quality, e.g., from a received error rate, while communicating with the slave transceiver 104; and to detect whether the outbound transmission quality is worse than the inbound transmission quality by more than a predetermined margin; and to cooperate with the transmitter 206 to command the slave transceiver 104 to take control of the first wireless network as master, in response to detecting that the outbound transmission quality is worse than the inbound transmission quality by more than the predetermined margin. The reason for doing this is that it appears that the slave transceiver may be near a strong interfering master transceiver 102. By reversing roles and making the slave the new master of the wireless network, the new master will align the hop interval of the wireless network with that of the strong interfering master transceiver 102, thereby possibly gaining somewhat more resistance to the interference therefrom. In addition, the memory 208 includes a transceiver identifier 222 for uniquely identifying the master transceiver 102 through well-known techniques.

Figure 3:
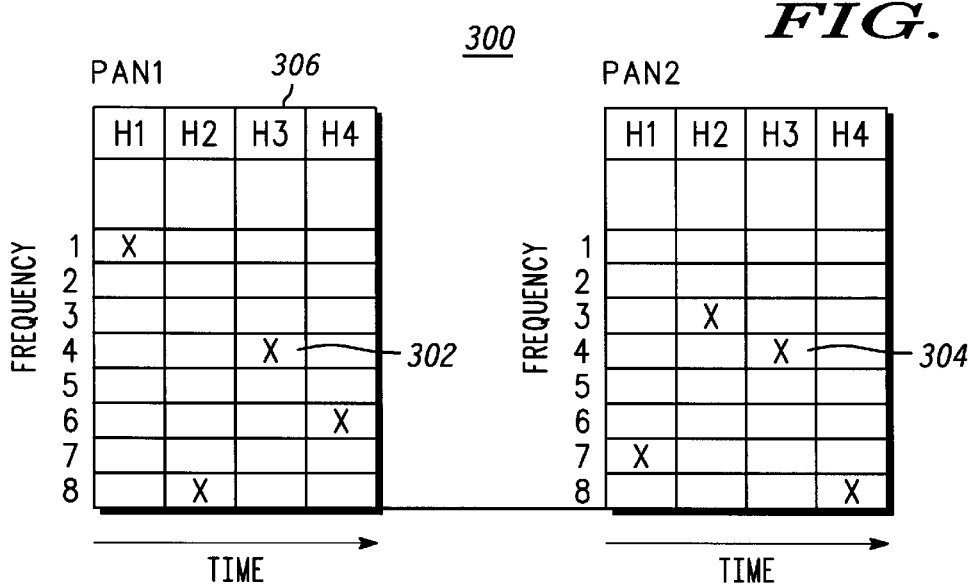
FIG. 3 is an exemplary hopping sequence diagram in accordance with the present invention.

Referring to FIG. 3, an exemplary hopping sequence diagram 300 in accordance with the present invention depicts the hopping sequences of two neighboring personal area networks, PAN1 and PAN2. The columns 306 represent different hop intervals, H1–H4. The rows of the diagram 300 represent transmission frequency number, in this case frequency numbers 1–8. The X in each column marks the transmission frequency number assigned to the hopping interval. For example, for PAN1, frequency number 1 is assigned to hop interval H1. Note that the frequency hopping plans are different between PAN1 and PAN2 in an attempt to avoid a collision. Note that, because there is no frequency coordination between PAN1 and PAN2, in hop interval H3 both PAN1 and PAN2 are using the same frequency (number 4) at the points 302 and 304. The frequencies of each hopping plan are randomly assigned to each hop interval. There is thus a non-zero probability that PAN1 and PAN2 will assign the same frequency to one of the hop intervals, resulting in a collision.

Figure 4:
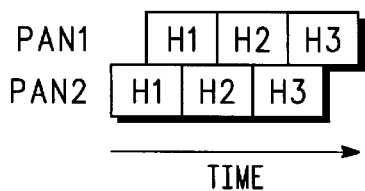
FIG. 4 is an exemplary timing diagram depicting misaligned hop intervals as occurs among prior art wireless networks.

Referring to FIG. 4, an exemplary timing diagram 400 depicts misaligned hop intervals as can occur in prior-art frequency hopping wireless networks. The effect of the misalignment is to make it possible for each hop interval of a first network to collide with either of two hop intervals of another network. For example, H1 of PAN1 can collide with either H1 or H2 of PAN2. Prior-art frequency hopping networks have relied upon randomly assigned frequency hopping patterns and a large number of, e.g., 79, frequencies to keep the probability of collisions low. Those techniques have performed adequately for small systems which have had only a few neighboring networks. As collocated networks are added to achieve more throughput, however, those techniques can reach a "saturation point" where the probability of collision is so great that adding another collocated network actually reduces the maximum throughput.

Figure 5:
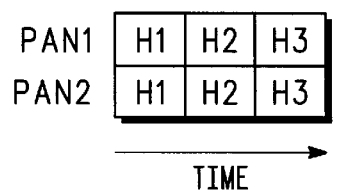
FIG. 5 is an exemplary timing diagram depicting aligned hop intervals in accordance with the present invention.

Referring to FIG. 5, an exemplary timing diagram 500 depicts aligned hop intervals in accordance with the present invention. By aligning the hop intervals, the present invention advantageously prevents a hop interval of a first network from colliding with more than one hop interval of another network, thereby reducing the probability of a collision by a factor of approximately two, as compared with the prior art. Simulations made with and without applying the present invention have demonstrated that the maximum achievable throughput from collocated frequency hopping wireless networks when applying the present invention is approximately double the maximum achievable throughput without the present invention!

Figure 6:
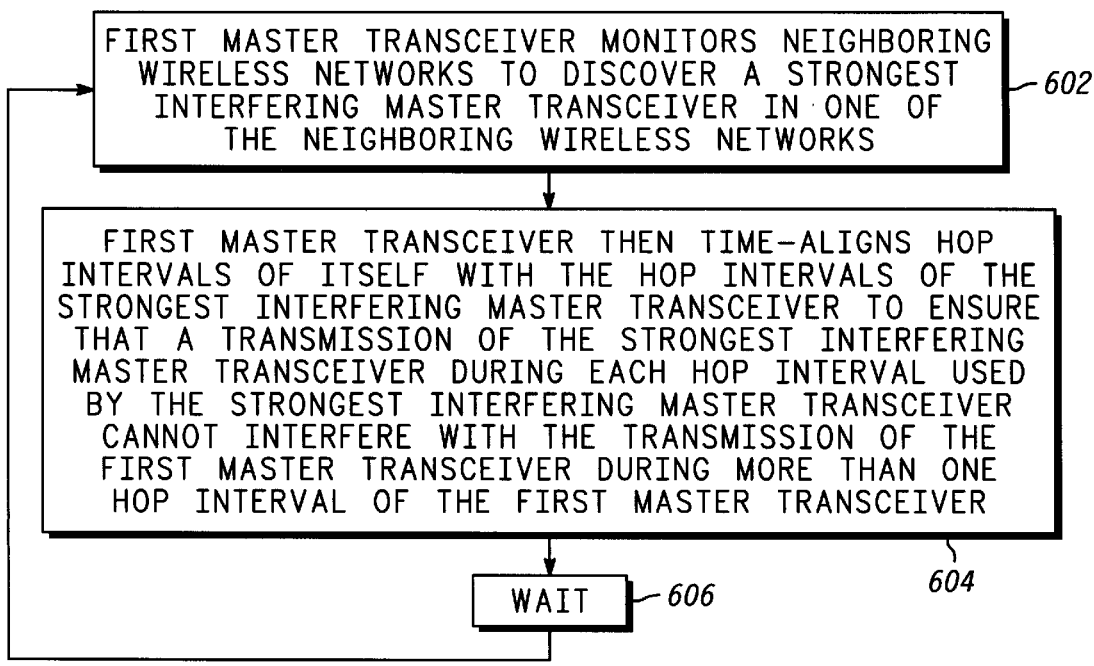
FIG. 6 is a flow diagram depicting a first operation of a master transceiver in accordance with the present invention.

Referring to FIG. 6, a flow diagram 600 depicting a first operation of a first master transceiver 102 in accordance with the present invention begins with the first master transceiver 102 monitoring 602 neighboring wireless networks, through well-known techniques, to discover a strongest interfering master transceiver 102 in one of the neighboring wireless networks. The first master transceiver 102 preferably determines the strongest interfering master transceiver 102 by measuring received signal strength and duty cycles of interfering master transceivers 102 through well-known techniques. The strongest interfering master transceiver 102 is then determined as a function of the received signal strength and duty cycle measurements, e.g., the master transceiver 102 having the highest product of signal strength and duty cycle is selected. It will be appreciated that, alternatively, other parameters, e.g., bit error rate, and other suitable mathematical functions can be utilized to determine the strongest interfering master transceiver 102, as well.

After discovering the strongest interfering master transceiver 102, the first master transceiver 102 time-aligns 604 the hop intervals of itself with the hop intervals of the strongest interfering master transceiver 102, through well-known synchronization techniques. The first master transceiver 102 waits 606 a predetermined time, and then returns to step 602 to continue to monitor the neighboring wireless networks in an attempt to discover a different strongest interfering master transceiver 102 to align with. Whenever the first master transceiver 102 performs a time-alignment with a new or different strongest interfering master transceiver 102, the time-alignment preferably is adjusted sufficiently slowly to maintain uninterrupted synchronization with a slave transceiver 104 in communication with the first master transceiver 102.

As discussed herein above, aligning the hop intervals ensures that a transmission of the strongest interfering master transceiver 102 during each hop interval used by the strongest interfering master transceiver 102 cannot interfere with the transmission of the first master transceiver 102 during more than one hop interval of the first master transceiver 102, and vice versa. This reduces the probability of collisions among the networks by a factor of approximately two. Stated differently, aligning the hop intervals advantageously nearly doubles the maximum throughput attainable by a plurality of collocated frequency hopping wireless networks.

Figure 7:
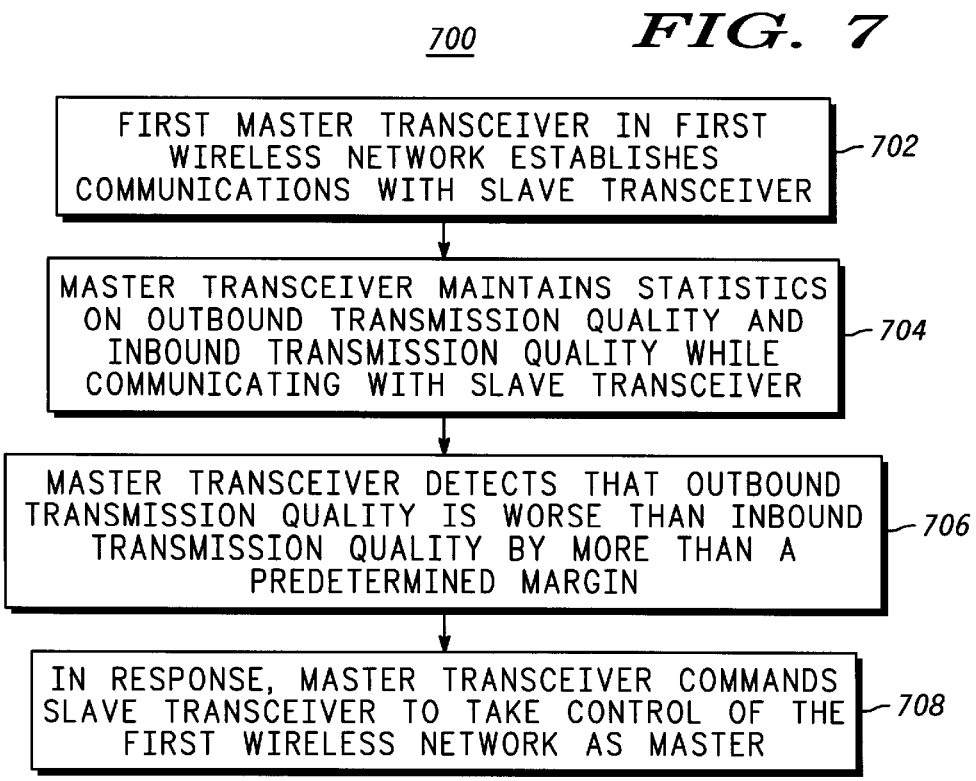
FIG. 7 is a flow diagram depicting a second operation of a master transceiver in accordance with the present invention.

Referring to FIG. 7, a flow diagram 700 depicting a second operation of a master transceiver 102 in accordance with the present invention begins with the first master transceiver 102 in a first master network establishing 702 communications with a slave transceiver 104. The first master transceiver 102 maintains 704 statistics on the outbound (with respect to the first master transceiver 102) transmission quality, e.g., through positive and negative acknowledgments, and on the inbound transmission quality while communicating with the slave transceiver 104. The first master transceiver 102 then determines 706 whether the outbound transmission quality is worse than the inbound transmission quality by more than a predetermined margin. If so, the first master transceiver 102 commands 708 the slave transceiver 104 to take control of the first wireless network as master. The assumption here is that when the outbound transmission quality is worse than the inbound transmission quality by more than the predetermined margin, the condition is likely due to a strong interfering master transceiver 102 near the slave transceiver 104. If that is true, aligning the hop intervals of the first wireless network with the strong interfering master transceiver 102 will minimize the probability of collisions, i.e., interference, from the strong interfering master transceiver 102.

It should be clear from the preceding disclosure that the present invention provides a method and apparatus for minimizing a probability of self-interference among neighboring wireless networks operating in accordance with differing frequency hopping plans that are not frequency-coordinated among the neighboring wireless networks. The present invention advantageously doubles the maximum achievable throughput of a plurality of collocated frequency hopping wireless networks, as compared with the prior art.

Many modifications and variations of the present invention are possible in light of the above teachings. Thus, it is to be understood that, within the scope of the appended claims, the invention can be practiced other than as specifically described herein above.

What is claimed is:

1. A method for minimizing a probability of self-interference among neighboring wireless networks operating in accordance with differing frequency hopping plans that are not frequency-coordinated among the neighboring wireless networks, the method comprising in a first master transceiver of a first wireless network the steps of:

monitoring the neighboring wireless networks to discover a strongest interfering master transceiver in one of the neighboring wireless networks; and time-aligning hop intervals of the first master transceiver with the hop intervals of the strongest interfering master transceiver to ensure that a transmission of the strongest interfering master transceiver during each hop interval used by the strongest interfering master transceiver cannot interfere with the transmission of the first master transceiver during more than one hop interval of the first master transceiver, thereby minimizing the probability of self-interference between the first wireless network and the one of the neighboring wireless networks.

2. The method of claim 1, wherein the monitoring step comprises the steps of:

measuring signal strengths of neighboring interfering master transceivers; and selecting an interfering master transceiver having a highest signal strength as the strongest interfering master transceiver.

3. The method of claim 1, wherein the monitoring step comprises the step of:

measuring duty cycles of neighboring interfering master transceivers; and selecting an interfering master transceiver as the strongest interfering master transceiver according to a duty cycle of the interfering master transceiver.

4. The method of claim 1, wherein the time-aligning step comprises the steps of:

time-aligning transmit hop intervals of the first master transceiver with the transmit hop intervals of the strongest interfering master transceiver; and time-aligning receive hop intervals of the first master transceiver with the receive hop intervals of the strongest interfering master transceiver.

5. The method of claim 1, further comprising in the first master transceiver the steps of:

maintaining statistics on an outbound transmission quality and an inbound transmission quality while communicating with a slave transceiver;

detecting whether the outbound transmission quality is worse than the inbound transmission quality by more than a predetermined margin; and commanding the slave transceiver to take control of the first wireless network as master, in response to detecting that the outbound transmission quality is worse than the inbound transmission quality by more than the predetermined margin.

6. The method of claim 1, further comprising in the first master transceiver the steps of:

continuing to monitor the neighboring wireless networks in an attempt to discover a different strongest interfering master transceiver; and time-aligning the hop intervals of the first master transceiver with the hop intervals of the different strongest interfering master transceiver, in response to discovering the different strongest interfering master transceiver.

7. The method of claim 1, wherein the time-aligning step is performed sufficiently slowly to maintain uninterrupted synchronization with a slave transceiver in communication with the first master transceiver.

8. A first master transceiver of a first wireless network for minimizing a probability of self-interference among neighboring wireless networks operating in accordance with differing frequency hopping plans that are not frequency-coordinated among the neighboring wireless networks, the first master transceiver comprising:

a receiver for monitoring the neighboring wireless networks to discover a strongest interfering master transceiver in one of the neighboring wireless networks;

a processor coupled to the receiver and coupled to a transmitter for time-aligning hop intervals of the first master transceiver with the hop intervals of the strongest interfering master transceiver to ensure that a transmission of the strongest interfering master transceiver during each hop interval used by the strongest interfering master transceiver cannot interfere with the transmission of the first master transceiver during more than one hop interval of the first master transceiver, thereby minimizing the probability of self-interference between the first wireless network and the one of the neighboring wireless networks; and the transmitter for sending information to a slave transceiver.

9. The first master transceiver of claim 8, wherein the processor is programmed to:

cooperate with the receiver to measure signal strengths of neighboring interfering master transceivers; and select an interfering master transceiver having a highest signal strength as the strongest interfering master transceiver.

10. The first master transceiver of claim 8, wherein the processor is programmed to:

cooperate with the receiver to measure duty cycles of neighboring interfering master transceivers; and select an interfering master transceiver as the strongest interfering master transceiver according to a duty cycle of the interfering master transceiver.

11. The first master transceiver of claim 8, wherein the processor is programmed to:

time-align transmit hop intervals of the first master transceiver with the transmit hop intervals of the strongest interfering master transceiver; and time-align receive hop intervals of the first master transceiver with the receive hop intervals of the strongest interfering master transceiver.

12. The first master transceiver of claim 8, wherein the processor is programmed to:

maintain statistics on an outbound transmission quality and an inbound transmission quality while communicating with the slave transceiver;

detect whether the outbound transmission quality is worse than the inbound transmission quality by more than a predetermined margin; and cooperate with the transmitter to command the slave transceiver to take control of the first wireless network as master, in response to detecting that the outbound transmission quality is worse than the inbound transmission quality by more than the predetermined margin.

13. The first master transceiver of claim 8, wherein the processor is programmed to:

continue to cooperate with the receiver to monitor the neighboring wireless networks in an attempt to discover a different strongest interfering master transceiver; and time-align the hop intervals of the first master transceiver with the hop intervals of the different strongest interfering master transceiver, in response to discovering the different strongest interfering master transceiver.

14. The first master transceiver of claim 8, wherein the processor is programmed to time-align the hop intervals of the first master transceiver sufficiently slowly to maintain uninterrupted synchronization with the slave transceiver.

15. A first wireless network for minimizing a probability of self-interference with neighboring wireless networks operating in accordance with differing frequency hopping plans that are not frequency-coordinated among the neighboring wireless networks, the first wireless network comprising:

a first master transceiver arranged and programmed to:

monitor the neighboring wireless networks to discover a strongest interfering master transceiver in one of the neighboring wireless networks; and time-align hop intervals of the first master transceiver with the hop intervals of the strongest interfering master transceiver to ensure that a transmission of the strongest interfering master transceiver during each hop interval used by the strongest interfering master transceiver cannot interfere with the transmission of the first master transceiver during more than one hop interval of the first master transceiver, thereby minimizing the probability of self-interference between the first wireless network and the one of the neighboring wireless networks; and a slave transceiver communicating wirelessly with the first master transceiver.

16. The first wireless network of claim 15, wherein the first master transceiver is further arranged and programmed to:

measure signal strengths of neighboring interfering master transceivers; and select an interfering master transceiver having a highest signal strength as the strongest interfering master transceiver.

17. The first wireless network of claim 15, wherein the first master transceiver is further arranged and programmed to:

measure duty cycles of neighboring interfering master transceivers; and select an interfering master transceiver as the strongest interfering master transceiver according to a duty cycle of the interfering master transceiver.

18. The first wireless network of claim 15, wherein the first master transceiver is further arranged and programmed to:

time-align transmit hop intervals of the first master transceiver with the transmit hop intervals of the strongest interfering master transceiver; and time-align receive hop intervals of the first master transceiver with the receive hop intervals of the strongest interfering master transceiver.

19. The first wireless network of claim 15, wherein the first master transceiver is further arranged and programmed to:

maintain statistics on an outbound transmission quality and an inbound transmission quality while communicating with the slave transceiver;

detect whether the outbound transmission quality is worse than the inbound transmission quality by more than a predetermined margin; and command the slave transceiver to take control of the first wireless network as master, in response to detecting that the outbound transmission quality is worse than the inbound transmission quality by more than the predetermined margin.

20. The first wireless network of claim 15, wherein the first master transceiver is further arranged and programmed to:

continue to monitor the neighboring wireless networks in an attempt to discover a different strongest interfering master transceiver, and time-align the hop intervals of the first master transceiver with the hop intervals of the different strongest interfering master transceiver, in response to discovering the different strongest interfering master transceiver.

21. The first wireless network of claim 15, wherein the first master transceiver is further arranged and programmed to time-align the hop intervals of the first master transceiver sufficiently slowly to maintain uninterrupted synchronization with the slave transceiver.

* * * * *